United States Patent
Watts

(10) Patent No.: US 6,688,635 B1
(45) Date of Patent: Feb. 10, 2004

(54) MULTI-PURPOSE DEER-HUNTING CART

(76) Inventor: Benjamin H. Watts, 835 E. Lower Springboro Rd., Springboro, OH (US) 45066

( * ) Notice: Subject to any disclaimer, the term of this patent is extended or adjusted under 35 U.S.C. 154(b) by 0 days.

(21) Appl. No.: 09/616,050

(22) Filed: Jul. 13, 2000

Related U.S. Application Data

(60) Provisional application No. 60/154,829, filed on Nov. 12, 1999.

(51) Int. Cl.[7] ................................................ B62B 1/12
(52) U.S. Cl. .................................... 280/652; 280/47.24
(58) Field of Search ......................... 280/638, 38, 652, 280/656, 659, 47.2, 47.24, 47.33, 63, 79.11, 79.3, 293, 301, 1.5; 188/24.16, 19

(56) References Cited

U.S. PATENT DOCUMENTS

| | | | |
|---|---|---|---|
| 1,114,314 A | | 10/1914 | Turner |
| 2,401,986 A | | 6/1946 | Talbott |
| 2,499,458 A | | 3/1950 | Campbell |
| 2,775,465 A | * | 12/1956 | Swingler .................... 280/47.2 |
| 3,035,847 A | * | 5/1962 | Born ........................ 280/47.24 |
| 3,046,034 A | | 7/1962 | Herrick |
| 3,222,100 A | | 12/1965 | Lindzy |
| 3,554,334 A | * | 1/1971 | Shimano et al. .......... 188/24.16 |
| 3,652,105 A | * | 3/1972 | Humlong .................... 280/293 |
| 3,741,586 A | | 6/1973 | Wiczer |
| 3,887,208 A | * | 6/1975 | Vidal ......................... 280/652 |
| 4,045,040 A | | 8/1977 | Fails |
| 4,048,735 A | * | 9/1977 | Brunty .................... 280/47.24 |
| 4,227,710 A | * | 10/1980 | Laub ........................ 280/47.33 |
| 4,429,897 A | * | 2/1984 | Friedman et al. ......... 280/47.24 |
| 4,614,352 A | | 9/1986 | Cervantes |
| 4,749,209 A | | 6/1988 | Edmonds |
| 4,757,869 A | | 7/1988 | Morishita et al. |
| 4,762,310 A | | 8/1988 | Krajewski et al. |
| 4,789,180 A | * | 12/1988 | Bell ............................ 280/652 |
| 4,917,392 A | | 4/1990 | Ambasz |
| 5,110,081 A | | 5/1992 | Lang, Jr. |
| 5,295,556 A | | 3/1994 | Mullin |

(List continued on next page.)

FOREIGN PATENT DOCUMENTS

| | | | | |
|---|---|---|---|---|
| GB | 2204536 | * | 11/1988 | .............. 280/47.24 |
| GB | 2258435 | * | 2/1993 | .................. 280/652 |
| SU | 1749098 | * | 7/1992 | .............. 280/47.24 |

OTHER PUBLICATIONS

Charlie's Horse Homepage, www.charlieshorse.com/Product_Line/ , (copyright 1999).
Warren and Sweat Homepage, www.warrenandsweat.com/new/ , (date unknown).
xoutdoors.com On–line Shopping Catalogue, www.xoutdoors.com , (date unknown).

*Primary Examiner*—Frank Vanaman
(74) *Attorney, Agent, or Firm*—Stevens, Davis, Miller & Mosher, LLP

(57) ABSTRACT

A hand operated utility cart with an extended handle assembly capable of supporting extra long loads. The preferred embodiment includes a kick stand allowing for a free standing, horizontally level cart, a curved handle bar assembly with a threaded aperture allowing the load to remain in a horizontal position during operation and a locking hand brake system. The hand operated utility cart can be quickly broken down and reassembled to allow for easy transportation and storage.

46 Claims, 6 Drawing Sheets

U.S. PATENT DOCUMENTS

| | | |
|---|---|---|
| 5,330,212 A | 7/1994 | Gardner |
| 5,443,131 A * | 8/1995 | Bartlett ................. 280/656 |
| 5,492,196 A | 2/1996 | Michno |
| 5,564,720 A | 10/1996 | Stringer |
| 5,626,352 A | 5/1997 | Grace |
| 5,673,928 A | 10/1997 | Jury |
| 5,687,978 A * | 11/1997 | Rhodes et al. ......... 280/652 |
| 5,713,497 A | 2/1998 | Ponczek |
| D391,734 S | 3/1998 | Melgey |
| 5,845,539 A * | 12/1998 | Huang .................. 188/24.16 |
| 5,853,189 A | 12/1998 | Swartzlander |
| 5,887,879 A * | 3/1999 | Chumley ................ 280/652 |
| 6,039,333 A * | 3/2000 | Hamblin ................ 280/1.5 |
| 6,050,577 A * | 4/2000 | Smith .................... 280/638 |
| 6,142,491 A | 11/2000 | Darling, III |
| 6,164,671 A | 12/2000 | Darling, III |

* cited by examiner

MULTI-PURPOSE DEER-HUNTING CART

CROSS-REFERENCE TO RELATED APPLICATIONS

This claims priority from U.S. Provisional Patent Application serial No. 60/154,829 filed Nov. 12, 1999 incorporated herein by reference in its entirety.

This relates to United States Disclosure Document Number 430471, filed Jan. 29, 1998 incorporated herein by reference in its entirety.

BACKGROUND OF THE INVENTION

This invention relates to new and useful improvements of hand operated utility carts and more particularly to a process for transporting hunting game and equipment. It relates to hunting carts used in transporting game from the hunting site.

The use of carts is known in the prior art. Carts have been utilized for the purpose of transporting items. By way of example the prior art disclosed in the U.S. Pat No. 5,673,928 to Jury a folding portable cart, U.S. Pat. No. 5,295,556 to Mullin a multipurpose hunting cart, U.S. Pat. No. 5,492,196 to Michno a portable deer cart and tree stand, U.S. Pat. No. 4,045,040 to Fails a deer stand and game carrier, U.S. Pat. No. 5,713,497 to Ponczek a deer carrier, Design U.S. Pat. No. 391,734 to Melgey a cart for transporting harvested deer and Design U.S. Pat. No. 5,853,189 to Swartzlander a cart.

Prior hunting carts have had many disadvantages. One major difficulty is that other hunting carts are too low to the ground. This results in dragging the cart, hanging up on ground obstructions, and requires excess strength for pulling the cart. Additionally previous deer carts have had the main body of the cart built between the wheels of the cart. This inhibits the loading of the deer onto the cart. The deer must be loaded carefully between the wheels and frequently moved to avoid rubbing by the wheels. Another difficulty has been load stability.

Specifically regarding Design U.S. Pat. No. 5,853,189 discloses a collapsible, two-tier cart with a 'T' bar handle assembly. In order to keep the load from obstructing the wheels, this patent had to incorporate a two level design. This has resulted in excess weight designed into the cart. The straight 'T' bar design of the handle assembly places the load at an angle when transporting in a hand operated mode. This design results in the main body of the cart being on an incline causing the load to be off balance and making it difficult to maneuver. This incline also makes it difficult to operator the cart in a push mode. In this design, the placement of the wheels on the outside of the main carrying deck results in the need for a wider cart to transport similar size loads.

Previous designs have had many flaws. The principle object of this invention is to provide a cart that provides easy maneuverability in both a pushing and pulling direction while maximizing load area and provides load stability through the use of an extended handle assembly.

SUMMARY OF THE INVENTION

The primary object of the invention is to provide a machine that allows for weight and balance stability. A further object of the invention is to provide a machine with an extended handle assembly allowing for full walking stride without striking foot heels against cart. Other objectives of the invention are to provide a machine as narrow as possible for maneuverability without sacrificing stability, that reduces back strain potential, that allows comfort in pulling, that easily operates in a push or pull mode, that has clearance to overcome ground obstructions, that is quiet while being used, that assembles in minutes, that allows for easy loading/unloading, that breaks down for storage and transportation purposes.

Another object of the invention is to allow for the load to be level during operation, allow for easy break down by one person, to allow for one or two man operation.

Other objects and advantages of the present invention will become apparent from the following descriptions, taken in connection with the accompanying drawings, wherein, by way of illustration and example, an embodiment of the present invention is disclosed.

In light of the above mentioned shortcomings of the known prior arts, the present invention was developed. The invention is a hand operated utility cart which includes an extended handle assembly capable of supporting extra long loads, a primary platform and a modified bicycle fork assembly.

The cart includes a single platform mounted on top of two independent front bicycle fork assemblies. An extended handle assembly includes a long rectangular member, a bicycle handle bar with stem, an extended kickstand and a hand lock breaking system secured to the platform.

For a better understanding of the invention, its operating advantages and specific objectives of its uses, reference should be made to the accompanying drawings along with its descriptive matter in which there is illustrated embodiments of the invention.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms.

Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
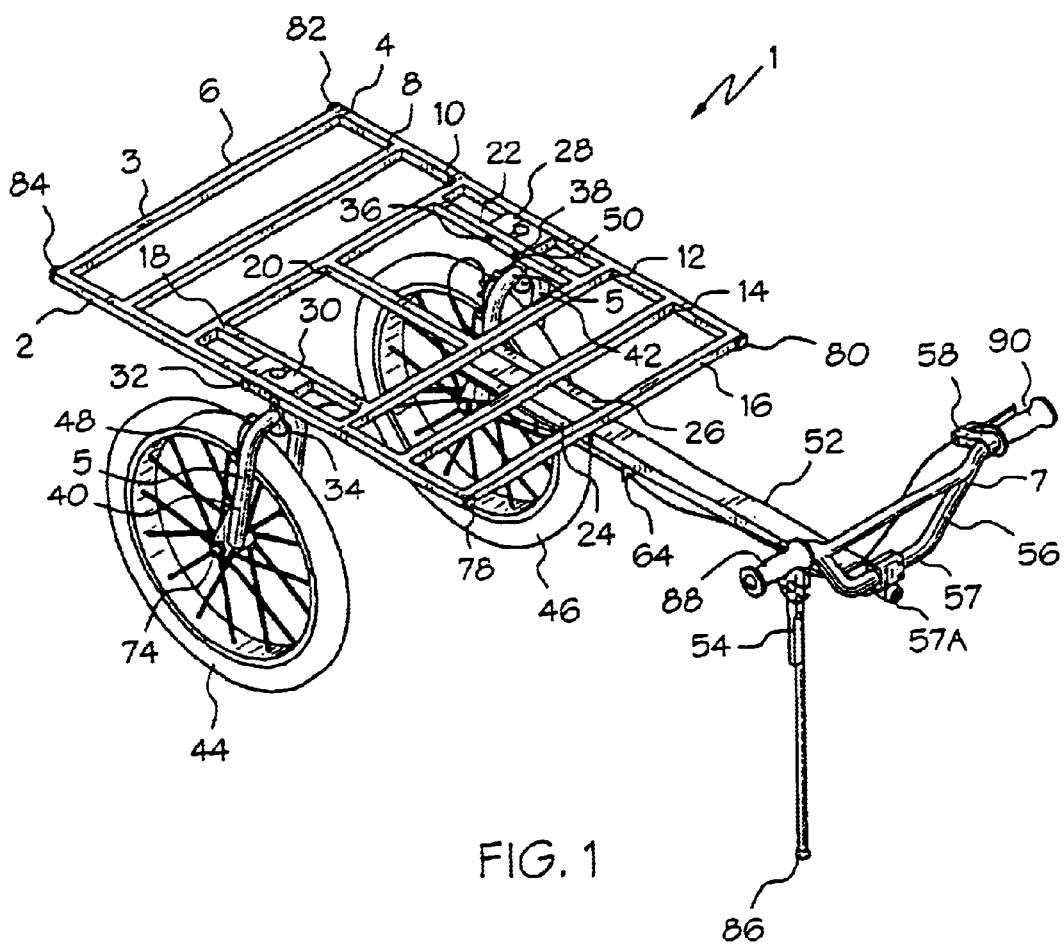
FIG. 1 is a perspective view of an embodiment of the present invention.

Turning first to FIG. 1 in which like reference numbers indicate like elements, there is shown an exploded view of a cart 1 of the present invention. The cart includes a single platform 3, two independent front bicycle fork assemblies 5 and an extended handle assembly 7.

The platform 3 is typically about 1 to about 2½ feet above the ground, preferable about 1½ to about 2 feet above the ground. The platform width is typically about 20 to 36 inches and its length is about 2 to about 5 feet preferably about 30 to about 52 inches.

The platform 3 includes two ¾ inch box tubes which are 36 inches long 2,4, six ¾ inch box tubes which are 24 inches long 6,8,10,12,14,16 and three ¾ inch box tubes which are 12 inches long 18,20,22. These items are joined by a rigid immobile relationship by welding. Overall dimensions of the platform 3 are 25½ inches by 36 inches but are not limited to this size. Two holes are drilled through each member 2,4 1⅜ inches from each side of center and two holes are also drilled through members 18 and 22 about 1⅜ inches from each side of center. Two 1 inch by 1 inch angle irons which are 12 inches long 24,26 are also welded to the bottom side of the main platform members 12,14 and 16 about 1 inch on each side of center.

Figure 8:
FIG. 8 is a schematic transverse cross-section of a platform of a second embodiment of the present invention.
Figure 9:
FIG. 9 is a schematic longitudinal cross-section of the platform of the embodiment of FIG. 8.
Figure 10:
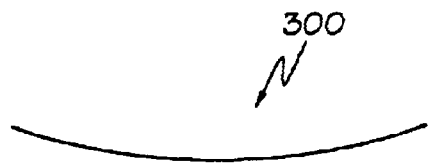
FIG. 10 is a schematic transverse cross-section of a platform of a third embodiment of the present invention.
Figure 11:
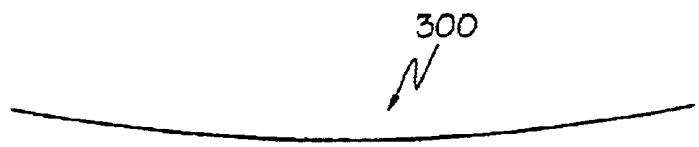
FIG. 11 is a schematic longitudinal cross-section of the platform of the embodiment of FIG. 8.
Figure 12:
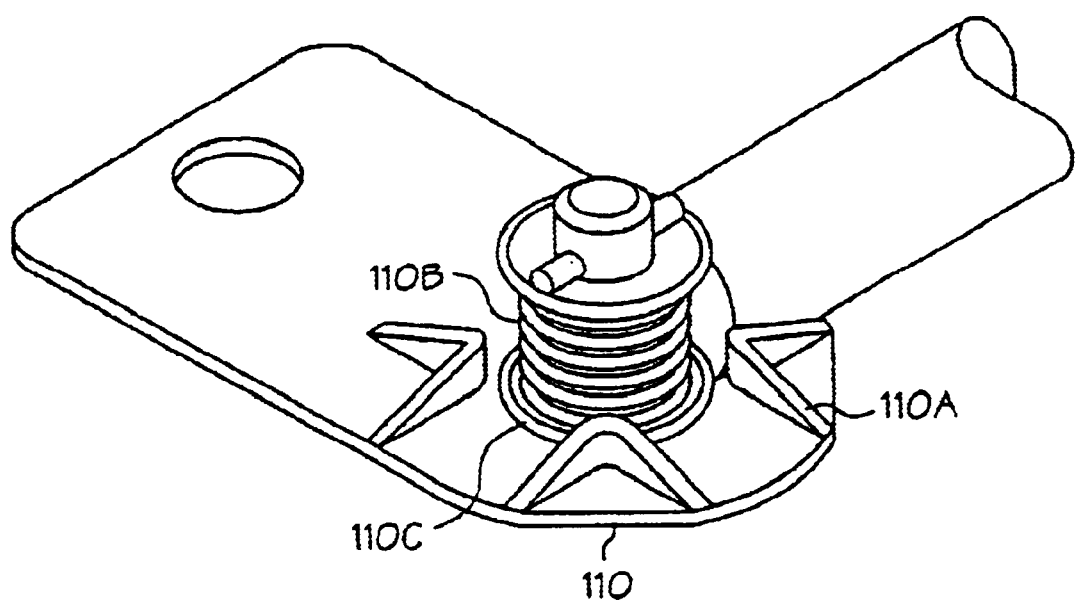
FIG. 12 shows an enlarged view of a portion of the kickstand of FIG. 5.

The platform 3 is shown as having a flat planar upper surface and a flat planer lower surface. However, in a second embodiment 200, the bars can be curved to form an upper surface having a concave cross-section in the transverse direction (FIG. 8) and a straight cross-section in the longitudinal direction (FIG. 9). In a third embodiment 300, the bars can be curved to form an upper surface having a concave cross section in both the transverse direction (FIG. 10) and longitudinal direction (FIG. 11). If desired the bars can be curved to form an upper surface having a straight cross-section in the transverse direction and concave cross-section in the longitudinal direction (not shown).

In accordance with the present invention, FIG. 1 shows two bicycle fork assemblies 5 secured with members 32,34, 36,38, which are typically 4 inch carriage bolts 32,34,36,38 secured to the main platform. Each fork assembly 5 is secured by two of the carriage bolts 32,34,36,38. Removal of any one of the two carriage bolts 32,34,36,38 for the respective fork assembly 5 forms a hinge. Each individual fork assembly 5 includes fork mounts 28,30 and bicycle forks, 40,42. The fork mounts 28,30 are 3¼ inches by 2 inches by ⅝ inch flat stock steel with a 1 inch hole through its center and two ¼ inch holes through its sides which are perpendicular to the 1 inch center hole and each about 1⅜ inches from center. The distance between each fork mount 28,30, and a respective bolt securing a brake to the fork assembly 5 is typically a minimum of 2½ inches. This will insure for proper clearance of the brake cable. The fork mount 28,30 is joined to the bicycle forks, 40,42 by a rigid immobile relationship by welding. Bicycle forks 40,42 are 20 inch front bicycle forks but are not restricted to that size.

Each bicycle fork 40, 42 has a stem 40A, a first prong 40B and a second prong 40C. Each bicycle fork 40, 42 has a fork 40, 42 first end and a fork 40, 42 second end. The stem 40A has a stem first end and a stem second end. The stem first end is joined to the respective bicycle fork mount 28, 30. The stem 40A extends downwardly from the respective bicycle fork mount 28, 30 to the stem second end. The first prong 40B and the second prong 40C both extend downwardly from the stem second end to the fork 40, 42 second end where the two prongs of the respective fork are releasably attached to opposed sides of the respective wheel.

The wheel supports shown by FIG. 1 are U-shaped forks, and there are no elements of the cart between the wheel supports in a space of from ground level to a height of at least about 50% of the height of the platform lower plane above the ground level. Preferably, there are no elements of the cart between the wheel supports in a space of from ground level to a height of at least about 75% of the height of the platform lower plane above the ground level In accordance with an important feature of the present invention, there is shown in FIG. 1, wheels 44,46 which are 20 inch wheels secured to the forks using a quick release skewer 74,76. The wheel size is based upon the fork size used in the present invention.

Figure 2:
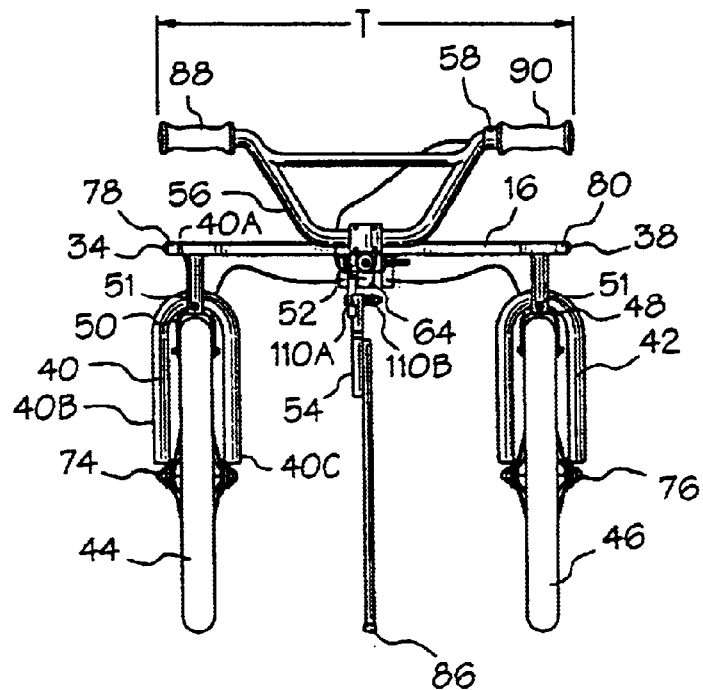
FIG. 2 is a plan front view of the embodiment of FIG. 1.
Figure 3:
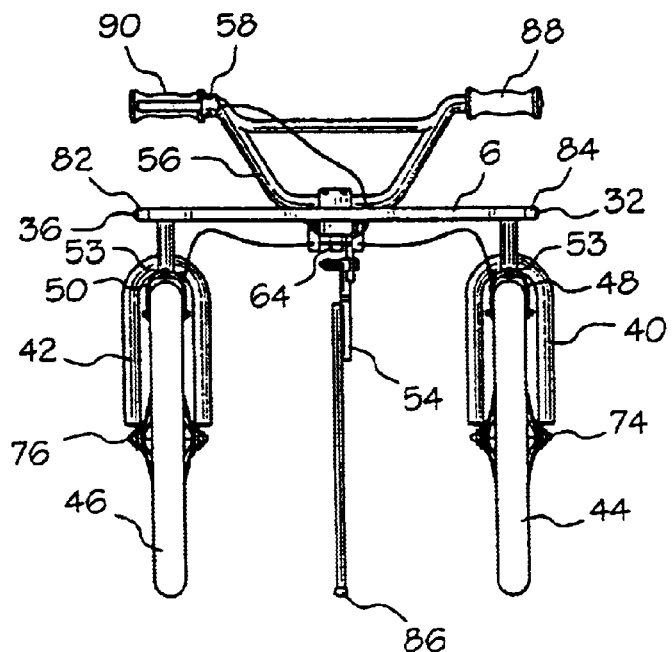
FIG. 3 is a plan rear view of the embodiment of FIG. 1.

To accomplish an important function of the invention, there is shown in FIG. 1, members 48,50 which are each an ATB Caliber Brake Set secured to each fork assembly 5 by means of a 2¾ inch bolt 51 (FIG. 2) having a ¼ 20 thread and a ¼ 20 nut 53 (FIG. 3).

Figure 7:
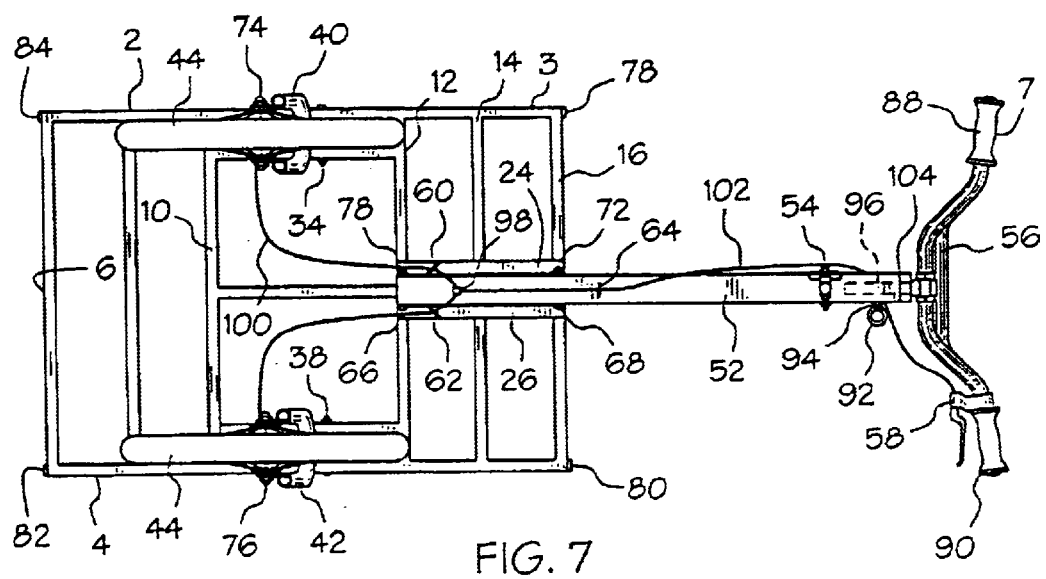
FIG. 7 is a plan bottom view of the embodiment of FIG. 1.

Turning to FIG. 7 brake cable steady mounts 60,62 each with a threaded hole, are permanently welded to members 24 and 26 at approximately a 30 degree angle about 10 inches from the front bar 16 of the platform 3. A brake cable 100 extends from one brake set 48 (FIG. 1) through the two steady mounts, 60,62, to a second brake set 50 (FIG. 1). Secured to the brake cable 100 between the steady mounts 60,62 is a yoke hanger mount 98. A second brake cable 102, which is secured to a yoke hanger mount 98 at the side nearest the platform 3, runs through a third steady mount 64 and is then attached to a locking hand brake 58. The locking hand brake 58 is attached to the transverse handle bar stem assembly 56. The platform 3 also has end caps 78, 80, 82 and 84 (FIG. 1).

Figure 4:
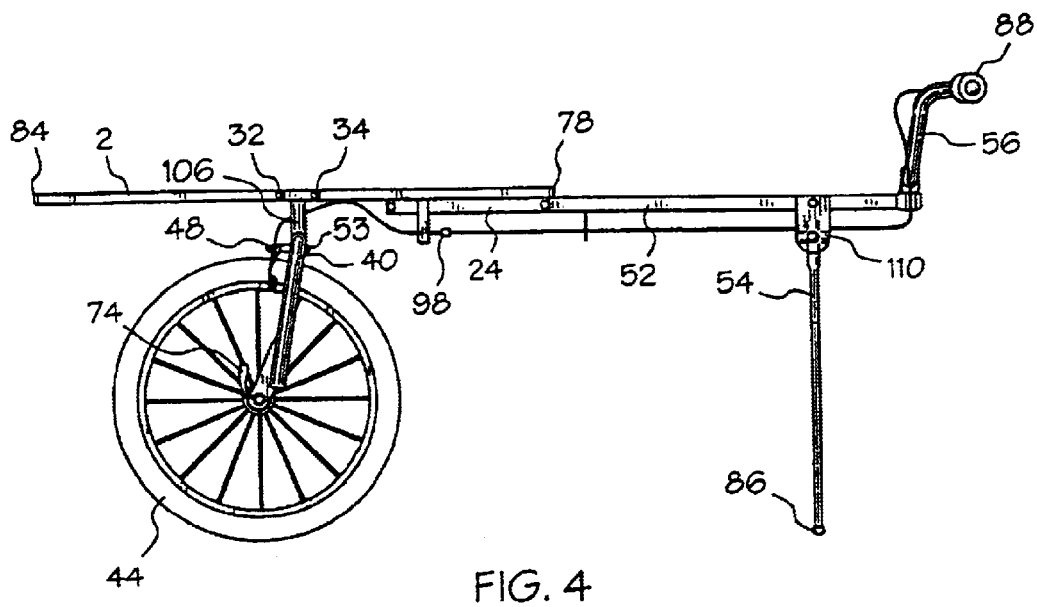
FIG. 4 and FIG. 5 is a plan side view of the embodiment of FIG. 1.
Figure 5:
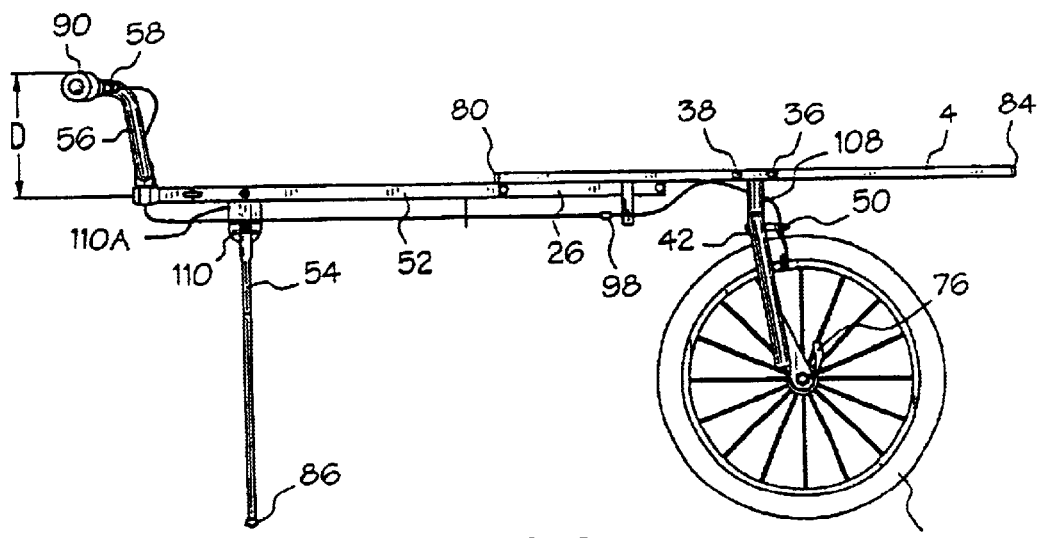
Figure 6:
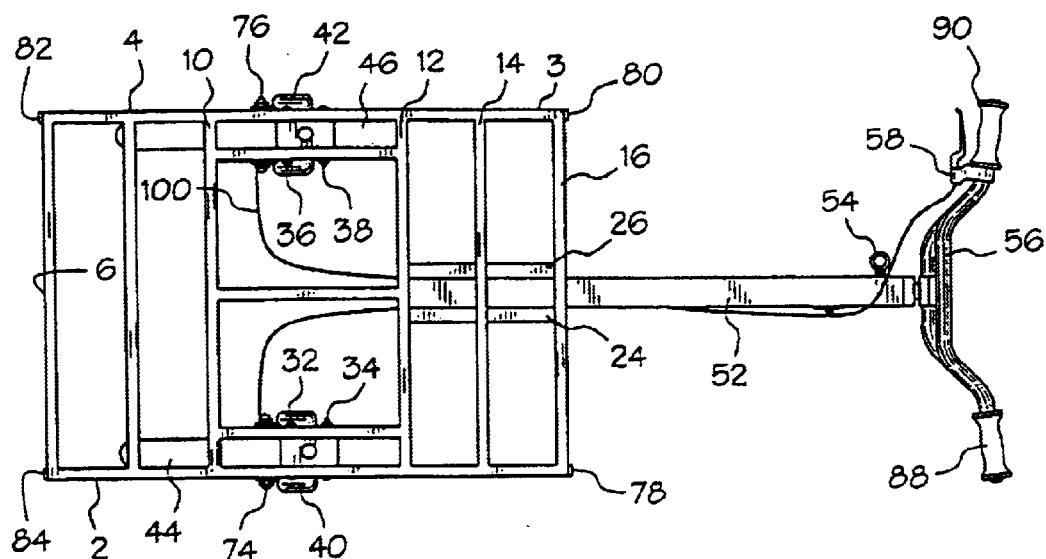
FIG. 6 is a plan top view of the embodiment of FIG. 1.

In accordance with an important feature of the present invention, there is shown in FIG. 7 the extended handle bar assembly 7. The primary piece is a 2 inch by 1 inch by 36 inch longitudinally arranged steel box tubing 52. Two 5/16 inch holes, which go entirely transversely through longitudinal tubing 52 and angle iron members 24,26, are located about ½ inch and about 11½ inches from the front base 16 of the platform 3 and are for securing the assembly to the angle iron members 24,26 (FIGS. 4,5,6). A third hole which is about ⅜ inches in diameter, goes through steel box tubing 52 and is located about 6 inches from the transverse handle bar stem assembly 56. This third hole is used to secure the kickstand 54 to the extended handle bar assembly 7 by means of a 2½-inch bolt, having a ⅜ inch 16 thread, and a ⅜ inch 16 nut. A smaller secondary screw is threaded through the kickstand mount into main tubing 52 and is used to eliminate twisting and turning of the kickstand. A final 5/16 inch hole is drilled into tubing 52, and member 96 (FIG. 7), a 1 inch by 6 inch steel tube, which has been welded into the inner diameter of longitudinal tubing 52. A ¼ inch 20-flange nut 94 is welded to tubing 52 with its center lining up with that of the final 5/16-inch hole as described above. A 1 inch long ¼ inch 20 threaded eye bolt 92 is then screwed into the flange nut 94 located on tubing 52. Eyebolt 92 penetrates through nut 94, tubing 52 and tube 96 and finally a stem 57A of the bicycle handle bar assembly 56. This helps to prevent the possible twisting of the bicycle handlebar assembly 56. Eyebolt 92 can also be used to fasten a load that extends beyond the front of the platform to the bicycle handlebar assembly 56.

Typically, the tubing 52 extends 2 to 3½ feet from the platform and the transverse handlebar stem assembly 56 has a U-shaped portion 57 and handle portions extending from the U-shaped portion having handles 88,90 and the locking hand brake 58 mounted on the handle portions, and the stem 57A provided with four screws for securing the U-shaped portion 57 (FIG. 1). Also typically the transverse handle bar stem assembly 56 extends a distance "D" of about 5 to about 12, preferably about 6 to about 8 inches, above the longitudinal axis of the longitudinal tubing 52 (see FIG. 5). The handlebar assembly has a width "T" typically about 12 to about 30 inches.

Still in FIG. 7 there is a 1 inch by 2 inch by ⅛ inch flat stock steel plate, member 104, with a 1 inch hole drilled though the center that is welded to the end of tubing 52 at the end nearest the handle bar assembly 56. The stem of the bicycle handlebar assembly 56 slides through the hole of member 104 and into the 1 inch steel tubing 96. The bicycle handlebar assembly 56 is secured to tubing 52 with an expander bolt and wedge.

Turning now to FIG. 5, the final piece shows a welded stop for single direction operation, namely, a small piece of round stock member 110 ½ inch length ¼ inch diameter, welded to the kick stand mount to prevent the kick stand from going past perpendicular when in use.

If desired, the kickstand may comprise a modified flattened bracket 110A (FIG. 5; the welded stop 110 for single directional operation; a spring 110B; and a washer 110C slipped between the spring 110B and the bracket 110A for added tension.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A hand operated utility cart comprising:
   a platform having a front end, a back end, and defining an upper surface and a lower surface;
   a longitudinal handle extending in a longitudinal direction from the platform, the longitudinal handle having a distal end and a proximal end relative to the platform;
   a transverse handle extending transversely at the distal end of the longitudinal handle;
   wheel supports extending downwardly from the platform;
   a respective wheel rotatably mounted to each wheel support, each wheel mounted for the cart to travel in the longitudinal direction;
   wherein the wheel supports each comprise a respective bicycle fork assembly, wherein a first end of each fork assembly is connected to the lower surface of the platform in proximity to a respective side end of the platform,
   each said bicycle fork assembly comprising at most two prongs, said two prongs being attached to opposed sides of the wheel, and
   a kick stand allowing for a free standing, horizontally level cart; and a hand braking system; wherein the transverse handle further comprises a curved handle bar assembly allowing a load on the cart to remain in a horizontal position during operation when being in motion by a user.

2. The cart of claim 1, wherein the kick stand comprises a flattened bracket; a welded stop for single directional operation; a spring; and a washer slipped between the spring and the bracket for added tension.

3. The cart of claim 1, wherein the hand braking system comprises a locking brake.

4. A hand operated utility cart comprising:
   a platform having a front end, a back end, and defining an upper surface and a lower surface;
   a longitudinal handle extending in a longitudinal direction from the platform, the longitudinal handle having a distal end and a proximal end relative to the platform;
   a transverse handle extending transversely at the distal end of the longitudinal handle;
   wheel supports extending downwardly from the platform;
   a respective wheel rotatably mounted to each wheel support, each wheel mounted for the cart to travel in the longitudinal direction, the wheels at least partially located beneath the platform;
   wherein the wheel supports each comprise a respective bicycle fork assembly, wherein a first end of each fork assembly is connected to the lower surface of the platform in proximity to a respective side end of the platform,
   each said bicycle fork assembly comprising at most two prongs, said two prongs being attached to opposed sides of the wheel,
   wherein the transverse handle comprises a U-shape portion having two opposed ends and opposed transverse handle portions extending from each end of the U-shaped portion.

5. The hand operated utility cart of claim 4, further comprising:
   a respective locking hand brake for at least two said wheels and a brake control attached to the transverse handle for activating at least one of the brakes; and
   a kickstand mounted to the longitudinal handle.

6. The cart of claim 5, wherein said respective brake for at least two said wheels comprising dual brakes and the brake control comprises a hand braking system comprising a single hand brake for operating the dual brakes; a cable mount located under the longitudinal handle; and a "Y" cable system utilizing two cables functionally connecting the single hand brake to operate dual brakes, said hand brake attached to the transverse handle.

7. A hand operated utility cart comprising:
   a platform having a front end, a back end, and defining an upper surface and a lower surface;
   a longitudinal handle extending in a longitudinal direction from the platform, the longitudinal handle having a distal end and a proximal end relative to the platform;
   a transverse handle extending transversely in opposing diverging lateral directions at the distal end of the longitudinal handle;
   wheel supports extending downwardly from the platform;
   a respective wheel rotatably mounted to each wheel support, each wheel mounted for the cart to travel in the longitudinal direction;
   wherein the wheel supports each comprise a respective bicycle fork assembly, wherein a first end of each fork assembly is connected to the lower surface of the platform in proximity to a respective side end of the platform,
   each said bicycle fork assembly comprising at most two prongs, said two prongs being attached to opposed sides of the wheel.

8. The cart of claim 7, the transverse handle further comprising a curved handle bar assembly comprising a threaded aperture; plus a bicycle handle.

9. The cart of claim 7, further comprising dual brakes and a hand braking system comprising a single hand brake for operating the dual brakes; a cable mount located under the longitudinal handle; and a 'Y' cable system utilizing two cables functionally connecting the single hand brake to operate dual brakes, said hand brake attached to the transverse handle.

10. The cart of claim 7, wherein the second end of each fork assembly being able to releasably attach a wheel, wherein the longitudinal handle lies along a longitudinal axis of the platform.

11. The cart of claim 10, wherein each bicycle fork is attached to a bicycle fork mount and the bicycle fork mount is attached to the platform by two bolts transversely passing through a portion of the frame and the bicycle fork mount.

12. The cart of claim 7, wherein each bicycle fork is attached to the platform by a respective hinge so that each fork can pivot to fold alongside the platform.

13. The cart of claim 7, wherein the wheels are entirely located beneath the platform lower surface.

14. The cart of claim 7, further comprising at most one kickstand extending downwardly from the longitudinal handle.

15. The cart of claim 7, further comprising at most one kickstand mounted to the longitudinal handle comprising a mount attached to the longitudinal handle and a movable extension member movable from an extended position at which it extends downwardly a given distance from the longitudinal handle to an unextended position away from the extended position.

16. The cart of claim 7, further comprising at most one kickstand mounted to the longitudinal handle comprising a mount attached to the longitudinal member and a pivotable extension member pivotable from an extended position at which it extends downwardly from the longitudinal handle to an unextended position at which it is substantially lying alongside the longitudinal member.

17. The cart of claim 7, wherein the platform upper surface is flat.

18. The cart of claim 7, wherein the platform upper surface is concave to have a concave transverse cross-section and a concave longitudinal cross-section.

19. The cart of claim 7, wherein the platform upper surface has a concave shaped transverse cross-section.

20. The cart of claim 7, wherein no members extend upwardly from the platform upper surface.

21. The cart of claim 7, further comprising a respective brake for at least two said wheels and a hand brake control for activating at least one of the brakes, said hand brake control attached to the transverse handle.

22. The cart of claim 21, wherein the brake control comprises a brake handle attached to the transverse handle, the brake handle attached to a cable, the cable being functionally attached to at least one of the brakes.

23. The cart of claim 21, wherein the brake control comprises a brake handle attached to the transverse handle, the brake handle attached to a cable, the cable being functionally attached to the brakes.

24. The cart of claim 21, further comprising at most one kickstand mounted to the longitudinal handle and wherein the hand brake control comprises a locking brake control.

25. The cart of claim 7, wherein the platform upper surface is flat and the transverse handle has an uppermost portion about 5 to about 12 inches above the surface in which the platform upper surface lies.

26. The cart of claim 7, wherein the platform upper surface is flat and the transverse handle has an uppermost portion about 6 to about 8 inches above the plane in which the platform upper surface lies.

27. The cart of claim 7, wherein the platform has a length of about 30 to 52 inches, a width of about 20 to about 36 inches and, when the platform lower surface is horizontal, the platform lower surface is about 12 to about 30 inches above a lowermost surface of the wheels.

28. The cart of claim 7, wherein the wheel supports are U-shaped forks, and there are no elements of the cart between the wheel supports in a space of from ground level to a height of at least about 50% of the height of the platform lower surface above the ground level.

29. The cart of claim 7, wherein the wheel supports are U-shaped forks, and there are no elements of the cart between the wheel supports in a space of from ground level to a height of at least about 75% of the height of the platform lower surface above the ground level.

30. The cart of claim 7
wherein the transverse handle comprises a bent handle bar assembly comprising a bent transverse member extending transversely in opposing diverging lateral directions at the distal end of the longitudinal handle allowing a load on the cart to remain in a horizontal position during operation when being in motion by a user.

31. The cart of claim 30, further comprising a kickstand extending downwardly from the longitudinal handle, wherein the wheel supports extend downwardly from the platform lower surface.

32. The cart of claim 30, wherein the bent handle bar assembly has a height "D" of about 5 to about 12 inches and a width "T" of about 12 to about 30 inches.

33. The cart of claim 30, wherein the bent handle bar assembly has a height "D" of about 6 to about 8 inches and a width "T" of about 12 to about 30 inches.

34. The cart of claim 30, wherein the transverse handle comprises a curved handle bar assembly allowing the load to remain in a horizontal position during operation.

35. The cart of claim 30, wherein the transverse handle comprises a transverse portion and two opposed handles extending from said transverse portion, wherein said transverse portion extends from said distal end of the longitudinal handle, wherein a first of the two opposed handles extends from a first end of the transverse portion and a second of the two opposed handles extends from a second end of the transverse portion, wherein the first and second ends of the transverse portion are more distal to the distal end of the longitudinal handle than where said transverse portion extends from said distal end of the longitudinal handle.

36. The cart of claim 7, wherein the platform upper surface is flat and has transverse solid bars between the platform front end and the platform back end defining part of the upper surface and the lower surface.

37. The cart of claim 7, wherein said bicycle fork assembly comprises a stem, said at most two prongs comprises a first prong and a second prong, said stem having a first stem end and a second stem end, said first stem end being said first end of the bicycle fork assembly, said stem extending downwardly from the platform to the stem second end, and said first prong and said second prong both extending downwardly from said stem second end to said second end of said bicycle fork assembly, said first prong end and the second prong being attached to opposed sides of the wheel.

38. The cart of claim 7,
wherein the transverse handle comprises a bent handle bar assembly allowing a load on the cart to remain in a horizontal position during operation when being in motion by a user, wherein the transverse handle comprises a curved handle bar assembly allowing the load to remain in a horizontal position during operating, said curved handle bar comprising a U-shaped portion and two opposed handles extending from respective ends of the U-shaped portion.

39. The cart of claim 7, wherein the platform upper surface as a rigid upper surface.

40. The cart of claim 7, further comprising a at most one kick stand allowing for a free standing, horizontally level cart; and a hand braking system.

41. The cart of claim 40, wherein the hand braking system comprises a locking brake.

42. The cart of claim 7, wherein the transverse handle further comprises a curved handle bar assembly allowing a load on the cart to remain in a horizontal position during operation when being in motion by a user.

43. The cart of claim 7, wherein the upper surface of the platform comprises a load supporting surface and the longitudinal direction, in which the longitudinal handle extends from the platform, is parallel to a longitudinal axis of the load supporting surface.

44. The cart of claim 43, wherein when the platform upper surface and longitudinal handle are horizontal, the transverse handle has an uppermost portion about 5 to about 12 inches higher than the platform upper surface.

45. The cart of claim 7, wherein there is at most one longitudinal handle.

46. The cart of claim 7, wherein the wheels are at least partially located beneath the platform.

* * * * *